United States Patent
Sweeney

(10) Patent No.: US 6,494,496 B1
(45) Date of Patent: Dec. 17, 2002

(54) MOLDABLE PLASTIC GUARD SEGMENT FOR A VARIABLE-LENGTH GUARD ASSEMBLY FOR CONDUITS

(75) Inventor: Michael A. Sweeney, Kent, OH (US)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

(21) Appl. No.: 09/691,610

(22) Filed: Oct. 18, 2000

Related U.S. Application Data
(60) Provisional application No. 60/164,420, filed on Nov. 9, 1999.

(51) Int. Cl.[7] ............................................. F16L 57/00
(52) U.S. Cl. ......................... 285/115; 285/116; 138/110
(58) Field of Search ............................... 285/115, 121.1, 285/48, 53, 116; 138/110, 118.1

(56) References Cited

U.S. PATENT DOCUMENTS

| | | | | |
|---|---|---|---|---|
| 1,587,327 A | * | 6/1926 | Johnson ....................... | 285/116 |
| 2,166,448 A | * | 7/1939 | Schuknecht et al. ........ | 285/116 |
| 2,289,271 A | * | 7/1942 | Kane et al. .................. | 285/115 |
| 3,088,756 A | * | 5/1963 | May .............................. | 285/116 |
| 3,109,461 A | * | 11/1963 | Wolff et al. .............. | 138/110 X |
| 3,413,021 A | * | 11/1968 | Potts ........................... | 285/319 |
| 3,926,141 A | | 12/1975 | Taylor | |
| 3,977,440 A | | 8/1976 | Philippi | |
| 4,009,734 A | | 3/1977 | Sullivan | |
| 4,226,103 A | | 10/1980 | Strickland | |
| 4,366,965 A | | 1/1983 | Rhodes | |

(List continued on next page.)

FOREIGN PATENT DOCUMENTS

| | | |
|---|---|---|
| DE | 8522245 | 9/1985 |
| DE | 9218416 | 3/1994 |
| EP | 0 655 377 A2 | 5/1995 |
| EP | 0 655 377 A3 | 5/1995 |
| EP | 0 824 205 A1 | 6/1997 |
| GB | 2 239 503 A | 7/1991 |
| NL | 6408413 | 1/1966 |

OTHER PUBLICATIONS

Parker–Hannifin Fluid Connectors Catalog 3502–E, entitled "Brass Fittings and Valves".
Parker–Hannifin Fluid Connectors Catalog 4660, dated Dec. 1993 entitled Parflex Thermoplastic Hose, Tubing, Fittings and Accessories.
Parker–Hannifin Fluid Connectors Bulletin 4452–814, dated Jan. 1979 entitled Parker Brake Coil Tractor/Trailer Coiled Air Brake Hose Assemblies.
Parker–Hannifin Fluid Connectors Bulleting 4452–816, dated Jan. 1984 entitled New From Parker Duo–Coil Tractor/Trailer Coiled and Air Brake Assembly.
Tectran Magnum® Dual–Line Armorcoil System.

*Primary Examiner*—Lynne H. Browne
*Assistant Examiner*—David E. Bochna
(74) *Attorney, Agent, or Firm*—John A. Molnar, Jr.

(57) ABSTRACT

A moldable plastic guard segment for use in a protective guard for a conduit such as a hoses, tubing, wire, cable, and fiber optics. The guard is receivable over the surface of the conduit and is formed as a series connection of a first guard segment and at least a second guard segment. Each of the guard segments is formed as having a generally-annular body which extends longitudinally along a central axis of the guard segment intermediate a first end and a second end defining a unit length of the guard therebetween. The body first end has an inner radial surface of a first diametric extent. The body second end has an outer radial surface of a second diametric extent configured to be receivable within the first diametric extent of the inner radial surface of the first end of an adjacent guard segment for coupling each guard segment to an adjacent guard segment in forming the guard.

26 Claims, 11 Drawing Sheets

U.S. PATENT DOCUMENTS

| | | |
|---|---|---|
| 4,406,852 A | 9/1983 | Riegel |
| 4,446,607 A | 5/1984 | Merritt et al. |
| 4,634,151 A | 1/1987 | Holt |
| 4,805,933 A | 2/1989 | Swisher |
| 4,876,810 A | 10/1989 | Plana et al. |
| 4,967,799 A | 11/1990 | Bradshaw et al. |
| 5,232,645 A | 8/1993 | Ramos, Jr. |
| 5,277,227 A | 1/1994 | Bradshaw et al. |
| D356,858 S | 3/1995 | Folkman |
| 5,608,963 A | 3/1997 | Lefere |
| 5,816,622 A * | 10/1998 | Carter .................... 138/110 X |
| 5,839,476 A * | 11/1998 | Blase ..................... 138/110 X |
| 5,857,711 A | 1/1999 | Comin-DuMong et al. |
| 5,884,695 A * | 3/1999 | Brownlee ................... 138/110 |
| 5,918,640 A | 7/1999 | Orcutt |
| 5,996,637 A * | 12/1999 | Larsson ..................... 138/110 |
| 6,012,494 A * | 1/2000 | Balazs ........................ 138/110 |
| 6,223,767 B1 * | 5/2001 | Otis ............................ 138/110 |

\* cited by examiner

MOLDABLE PLASTIC GUARD SEGMENT FOR A VARIABLE-LENGTH GUARD ASSEMBLY FOR CONDUITS

CROSS-REFERENCE TO RELATED CASES

The present application claims priority to U.S. Provisional Application Ser. No. 60/164,420; filed Nov. 9, 1999.

BACKGROUND OF THE INVENTION

The present invention relates broadly to protective guards for conduit such as hose, tubing, wire, cable, and fiber optics, and more particularly to a moldable, plastic guard segment having a first end adapted to be connected with a mating second end of another guard segment in providing a segmented guard assembly of a variable length.

When conduit such as hose, tubing, wire, cable, or fiber optics is exposed to certain environmental conditions, physical obstacles, or human abuse, the portion of the conduit so exposed may be protected with an external guard or armor. Such guards typically are formed as a coiled steel wire spring or, alternatively, as an elongate plastic or rubber sleeve or spiral. The coil, sleeve, or spiral is configured as having an inner diameter which is sized to be marginally larger than the outer diameter of the wire or conduit to allow the guard to be installed coaxially over the hose or wire. Guards or armor of such type are shown in U.S. Pat. Nos. 5,857,711; 5,816,622; 5,608,963; 5,277,227; 4,967,799; 4,876,810; 4,805,933; 4,446,607; 4,406,852; 3,926,141; and Des. 356,858; and in European Pat. Appln. Nos. 824,205; and 655,377. A plastic guard is manufactured by WABCO (Westinghouse Air Brake Co.) GmbH of Hannover, Germany. Typical applications of guards and coils of such type include the protection of hydraulic hose in construction machinery or plant equipment, and of airbrake tubing coils in tractor trailers rigs and other vehicles. Hoses, tubing, fittings, and other components for these applications are described further in U.S. Pat. Nos. 5,232,645; 4,009,734; and 3,977,440; and in U.K. Pat. Appln. GB 2,239,503. Such components are manufactured commercially by Parker-Hannifin Corporation of Cleveland, Ohio, through its Parflex Division of Ravenna, Ohio, and its Brass Products Division of Otsego, Mich., and by Tectran, Inc., of Mississauga, Ontario, Canada.

Each of the guard types heretofore known in the art offer varying degrees of strain relief and/or cut, crush, abrasion, or kink resistance. In general, steel wire springs offer good kink and abrasion resistance. However, as being formed of a metal, springs are subject to corrosion and are relatively heavy which may impact their use in certain mobile applications. When employed at the connected end of a hose or tubing assembly, the spring conventionally is locked to the end fitting which usually is provided as a multi-component including a body, nut, ferrule, and insert.

Plastic or rubber sleeves or spirals conventionally are manufactured by either extrusion, molding, or spiraling, and are known to be generally lightweight and corrosion resistant. In particular, extruded guards offer long, continuous lengths, but the raw materials suited for extrusion generally are considered to be either too flexible to prevent kinking, or too rigid to prevent flexing of the hose without breaking or kinking the guard absent the addition of strain relief slots. Spiral guards, typically provided as strips of plastic thermoformed about a mandrel into a helical shape, also offer long, variable lengths, but generally do not afford appreciable kink resistance. Molded guards can be formed with the rigidity necessary to prevent kinking, but heretofore have been limited in length to the size of the mold.

In view of the foregoing, it is believed that continued improvements in guard constructions for wire and conduit tubing coil assemblies would be well-received by the transportation, construction, and other industries involved. A preferred construction would be economical to manufacture, but also would afford good abrasion and kink resistance. Such a construction additionally would be corrosion resistant and accommodate variable guard lengths.

BROAD STATEMENT OF THE INVENTION

The present invention is directed to a protective guard for conduit such as hose, tubing, wire, cable, and fiber optics, and more particularly to a segmented guard assembly which may be varied in length depending upon the number of guard segments connected in series to form the assembly. In accordance with the precepts of the present invention, each of the guard segments which form the assembly is provided as a unit construction having a first end adapted to be coupled with a mating second end of another guard segment.

Such unit construction may be molded of plastic material which may be both corrosion-resistant and lightweight, and further which may be selected to provide sufficient rigidity to prevent kinking and to offer good abrasion resistance. Advantageously, the series connection of the first end of one unit to the second end of an adjacent unit allows a given unit length to cover a range guard lengths while obviating the need and expense of having to mold long, continuous guard lengths or guards of different lengths. The units may be removably joined such as with a threaded engagement, an interference, i.e., "snap" fit, or other mechanical method. Alternatively, the units may be permanently bonded using an adhesive, fusion welding, or other bonding method.

When employed, for example, as a point of attachment guard for lengths or coils of tubing or hose such as may be found in hydraulic or airbrake applications, the guard assembly and unit construction thereof of the present invention permits the use of economical, one-piece barbed-type fittings as the end connection for the tubing or hose. In this regard, the distal end of the first guard segment in the series may be interference fit over the hose or tubing end as received over the fitting barb. Such an arrangement eliminates the necessity of the more expensive multi-component fittings heretofore used with spring coil guards.

These and other advantages will be readily apparent to those skilled in the art based upon the disclosure contained herein.

BRIEF DESCRIPTION OF THE DRAWINGS

For a fuller understanding of the nature and objects of the invention, reference should be had to the following detailed description taken in connection with the accompanying drawings wherein.

Figure 1:
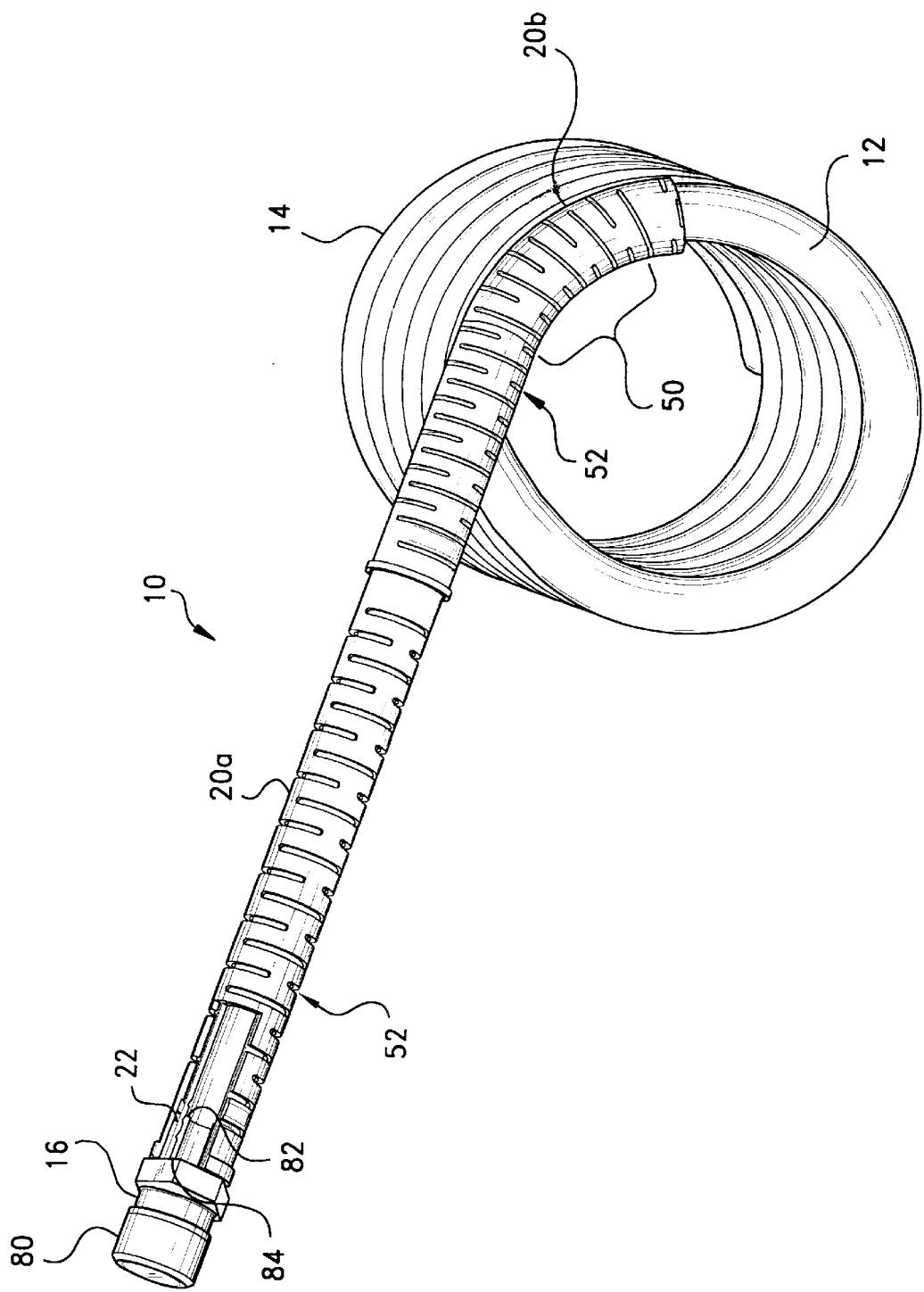
FIG. 1 is a perspective view including a partial cut-away section of a representative airbrake coil as fitted with a protective guard including a coupled first and a second guard segment in accordance with the present invention.

The drawings will be described further in connection with the following Detailed Description of the Invention.

DETAILED DESCRIPTION OF THE INVENTION

Certain terminology may be employed in the following description for convenience rather than for any limiting purpose. For example, the terms "forward," "rearward," "right," "left," "upper," and "lower" designate directions in the drawings to which reference is made, with the terms "inward," "inner," or "inboard" and "outward," "outer," or "outboard" referring, respectively, to directions toward and away from the center of the referenced element, and the terms "radial" and "axial" referring, respectively, to directions or planes perpendicular and parallel to the longitudinal central axis of the referenced element. Terminology of similar import other than the words specifically mentioned above likewise is to be considered as being used for purposes of convenience rather than in any limiting sense.

For the illustrative purposes of the discourse to follow, the precepts of the protective conduit guard assembly of the present invention are described in conjunction with its adaptation for an airbrake tubing coil used within tractor/trailer rigs or other vehicles for supplying air pressure from a source to the airbrake system of the vehicle. In view of the discourse to follow, however, it will be appreciated that aspects of the present invention may find utility for protecting other fluid conduits used in variety of hydraulic, pneumatic, or other applications involving coiled or straight runs of tubing, hose, wire, cable, fiber optics, or the like. Use with those other such conduits and applications therefore should be considered to be expressly within the scope of the invention herein involved.

Referring then to the figures wherein corresponding reference characters are used to designate corresponding elements throughout the several views with equivalent elements being referenced with prime designations, shown generally at 10 in FIG. 1 is a representative embodiment according to the present invention of protective guard assembly which is sheathed coaxially over the external surface, 12, of one end of an airbrake tubing coil, 14, having an associated fitting, 16. In basic construction, guard assembly 10 includes a generally flexible, elongate first guard segment, 20a, and at least a second guard segment, 20b, which is coupled in series to the first segment 20a for defining the overall length of the assembly 10. It will be appreciated, however, that three or more segments 20 may be series coupled depending upon the run length desired for guard assembly 10. A compressible sleeve, 22, optionally is provided for connecting the first guard segment 20a to the tubing 14 and/or to the fitting 16 at the interface of the tubing and fitting.

Figure 2:
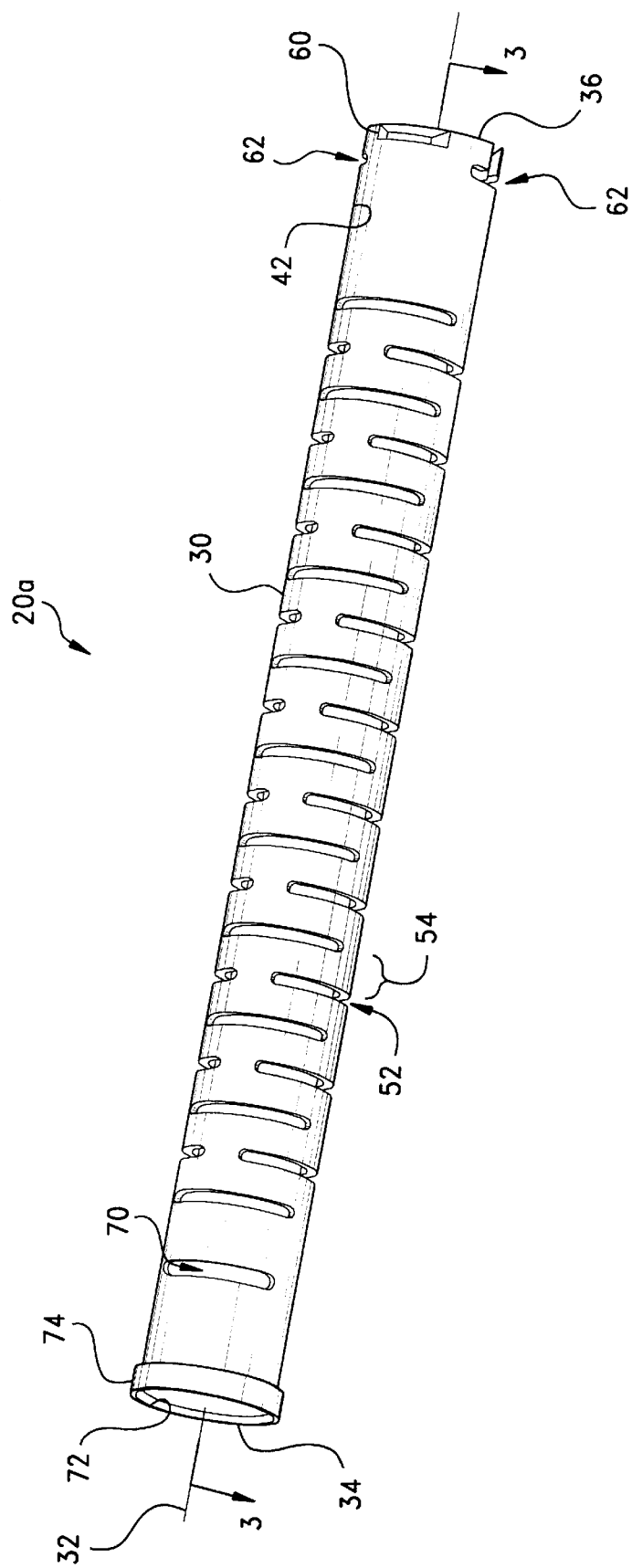
FIG. 2 is a perspective view of one of the guard segments of the guard assembly of FIG. 1.
Figure 3:
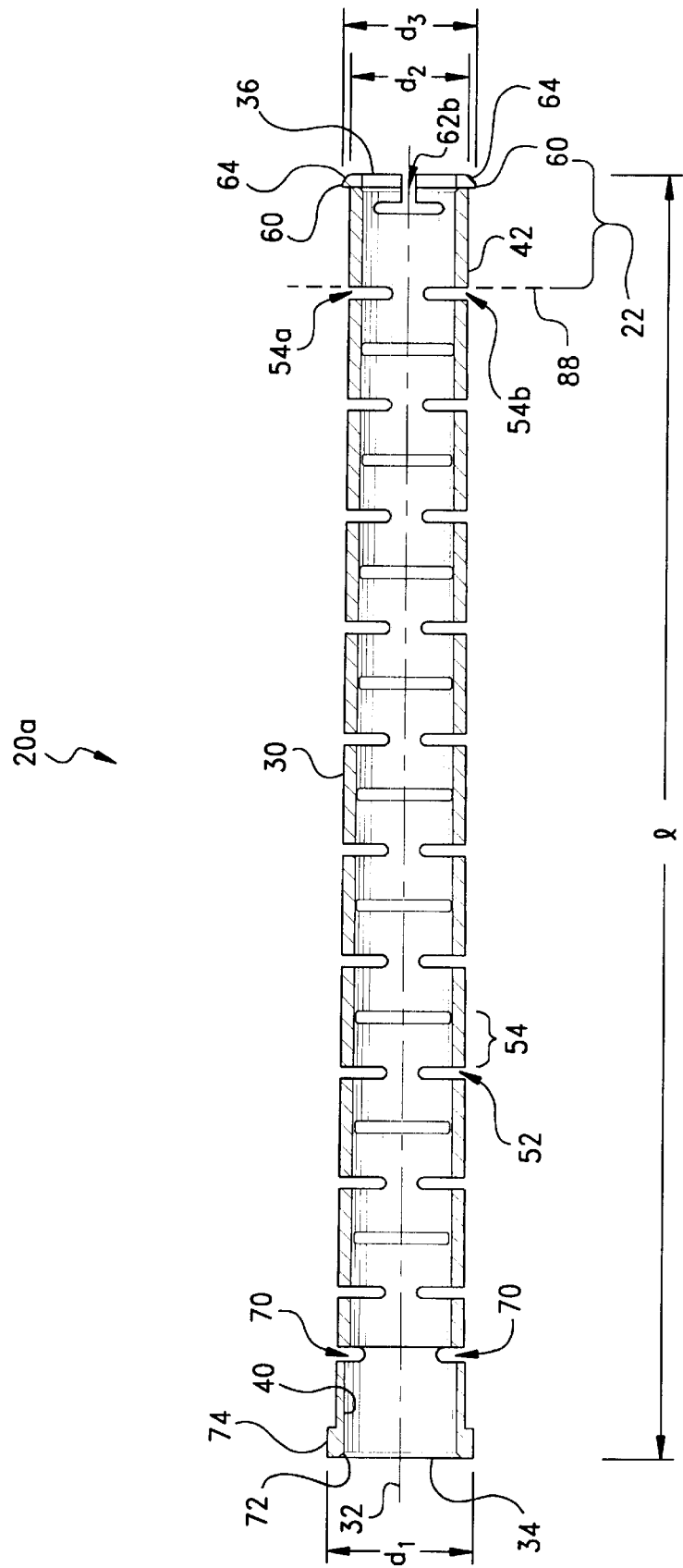
FIG. 3 is a cross-sectional view of the guard segment of FIG. 2 taken through the plane represented by line 3—3, which plane is perpendicular to the longitudinal axis of the assembly.

As may be seen best with reference to the perspective and cross-sectional views of first guard segment 20a which are shown, respectively, in FIGS. 2 and 3, each of the guard segments 20 is formed as having an elongate, generally-annular body, 30. Body 30, which in the illustrated embodiment is shown to be generally symmetrical, extends longitudinally along a central axis, 32, of each guard segment intermediate a first end, 34, and a second end, 36, which define a unit length, referenced at "l" in the cross-sectional view of FIG. 3, of the guard assembly 10 (FIG. 1) therebetween. With reference particularly to the cross-sectional view of FIG. 3, the body first end 34 may be seen as having an inner radial surface portion, 40, which is of a first diametric extent, referenced at "$d_1$," with the body second end 36 having an outer radial surface portion, 42, of a second diametric extent, referenced at "$d_2$." For the series connection of each guard segment 20 to an adjacent guard segment, the dimensions $d_1$ and $d_2$ are of a geometry or size such that the second diametric extent of the second end outer radial surface portion 42 of each guard segment 20 is receivable within the first diametric extent of the first end inner radial surface portion 40.

Body 30 of each guard segment 20 may be molded of a synthetic rubber material such as Buna N, neoprene, or a thermoplastic blend. However, for increased rigidity and correspondingly improved kink resistance, it is preferred that body 30 be molded of a plastic material such as a poly(ether ether ketone), polyimide, polyamide, polyolefin, polyetherimide, polybutylene terephthalate, fluoropolymer, polyvinyl chloride, polysulfone, polyester, acetal homo or copolymer, or a copolymer or blend thereof, with a nylon such as Nylon 11 or 12 being most preferred.

Returning to FIG. 1, it may be seen in the illustrated airbrake coil application that the tubing of coil 14 thereof will exhibit a minimum bend radius as is shown, for example, by the portion or the coil referenced at 50. So as to allow guard assembly 10 to resiliently conform to such bend radius, at least one the segments 20 thereof may be formed as having a series of strain relief slots, one of which is referenced at 52. As may be seen best with additional reference to the perspective and cross-sectional views of FIGS. 3 and 4, slots 52 may be molded or otherwise integrally-formed into body 30 as oppositely disposed pairs which are rotated relative to each adjacent pair to divide body 30 into a plurality of interconnected sections, one of which is referenced at 54. In this way, body 30 is made to be resiliently flexible within orthogonally-disposed planes on opposite sides of each section accommodating the flexure of each guard segment 20 in two degrees of freedom.

Figure 4:
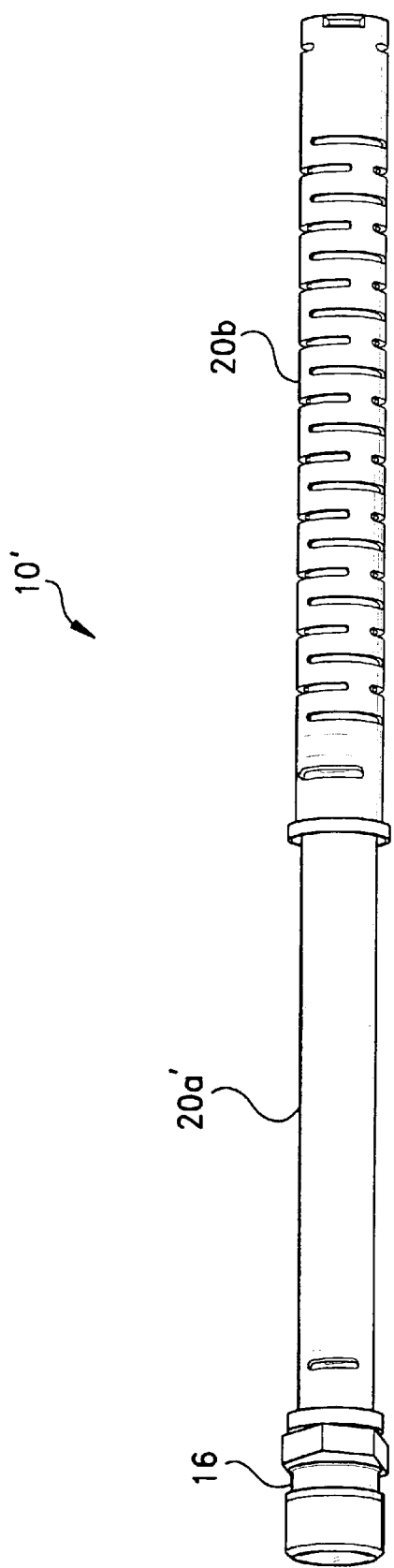
FIG. 4 is a perspective view of an alternative embodiment of the guard of FIG. 1.

Alternatively, guard assembly 10 may be configured as is shown at 10' in FIG. 4. In such configuration, first guard segment 20a may be molded or otherwise formed as is shown at 20a' without slots 52. Segment 20a' thereby is provided to be generally rigid to provide, for example, a hand-graspable lever or handle which may be used in place of the more complicated and expensive handle arrangements heretofore used in the "gladhand" connection of airbrake coils to the vehicle air supply. "Gladhand" connections and conventional handles of the type herein involved are further described in U.S. Pat. Nos. 5,918,640; 4,634,151; 4,366,965; and 4,226,103.

Figure 5:
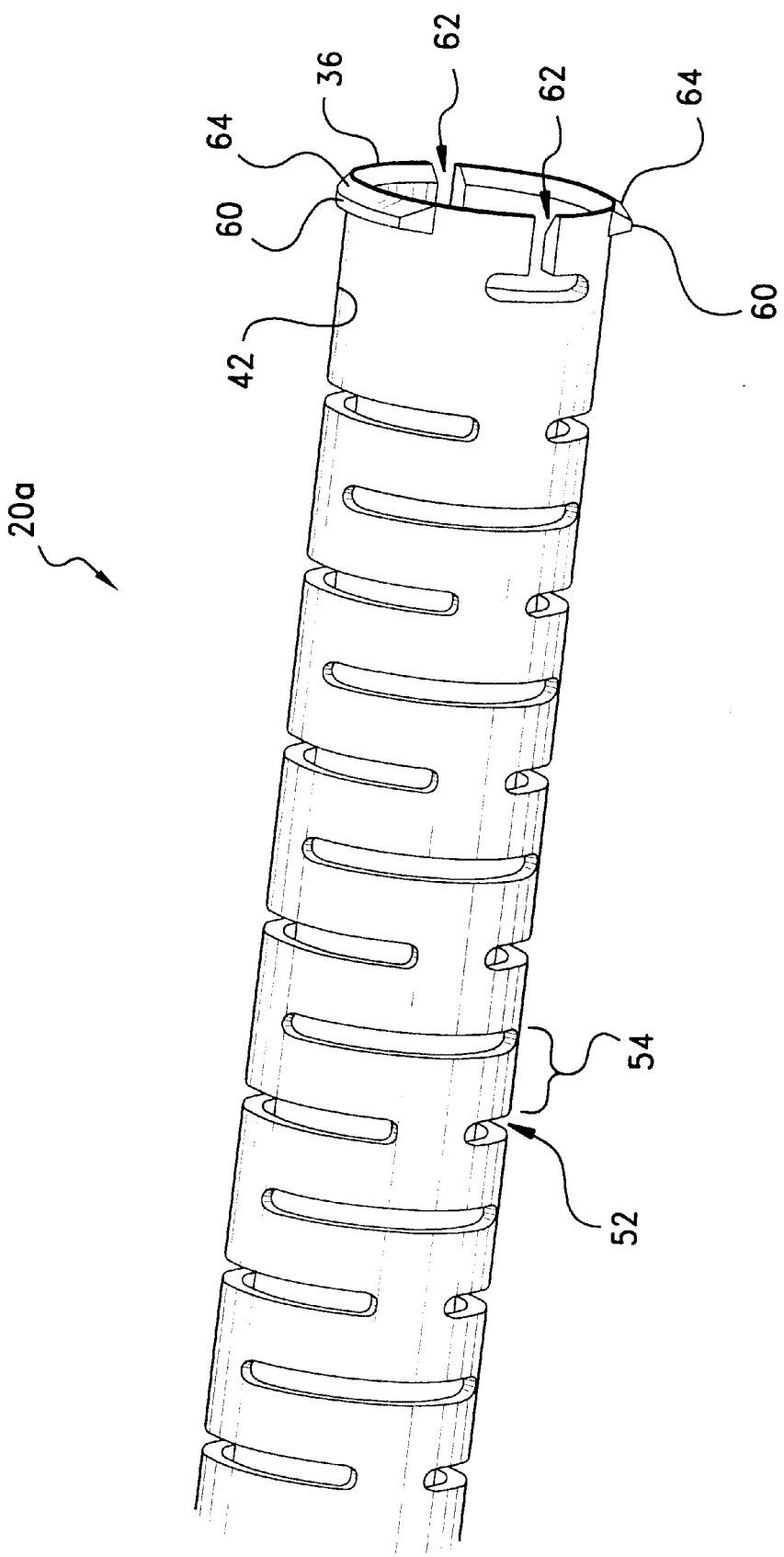
FIG. 5 is an enlarged perspective view showing one end of the guard segment of FIG. 2 in enhanced detail.
Figure 6:
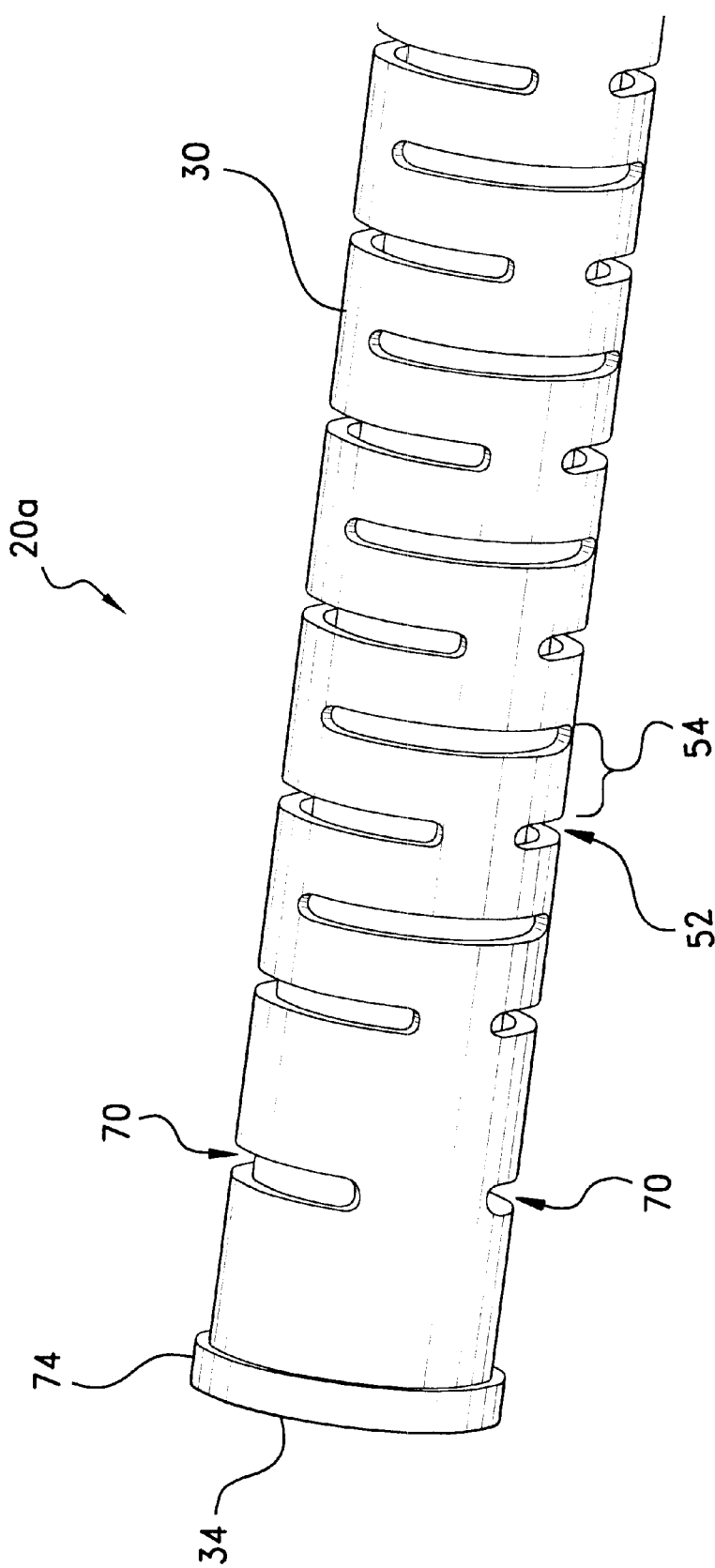
FIG. 6 is an enlarged perspective view showing the other end of the guard segment of FIG. 2 in enhanced detail.

For connecting the first and second guard segments 20a–b, the body second end 36 of each of the segments is formed in the illustrated embodiment of FIGS. 2 and 3, and as is revealed in enhanced detail in the magnified end views of FIGS. 5 and 6, as having at least one and, preferably, two or more symmetrically spaced-apart, circumferential projections, commonly referenced at 60, which extend radially-outwardly from the outer radial surface 42 thereof to define a third diametric extent, referenced at $d_3$ in FIG. 3, which is incrementally larger than the first diametric extent $d_2$. Third diametric extent $d_3$ also may be normally larger than the first diametric extent defined by the body first end inner radial surface 40, with the body second end 36 being made resiliently collapsible responsive to its insertion within the first end 34 of an adjacent guard segment 20 via the provision of one or more rebates, commonly referenced at 62 in FIGS. 3 and 5, formed through end 36. That is, in the collapsed orientation of the body second end 36, the third diametric extent $d_3$ defined by projections 60 is made momentarily smaller than the first diametric of first end inner radial surface 40 accommodating the insertion of the second end of one guard segment 20 within the first end of a next adjacent guard segment. The collapsing of end 36 may be facilitated by the provision of a chamfered leading edge surface, commonly referenced at 64, on each of the projections 60.

Figure 7:
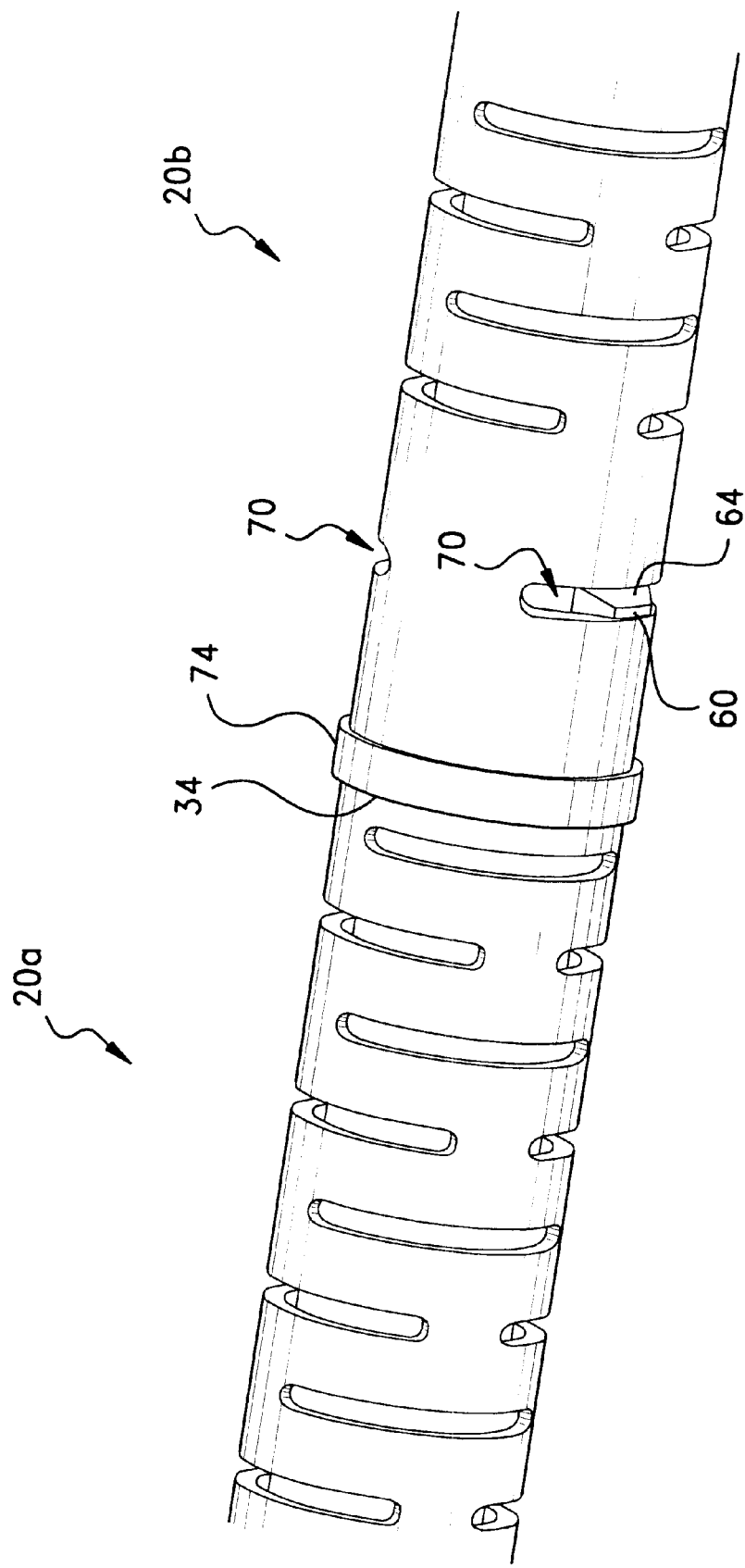
FIG. 7 is an enlarged perspective view showing the coupled section of the guard segments of FIG. 1 in enhanced detail.

Upon being received within the first end 34 of an adjacent guard segment 20, body second end 36 resiliently expands to its normal third diametric extent $d_3$. For receiving the projections 60 of the inserted guard segment 20, the body first end 34 is formed, as is revealed in FIGS. 3 and FIG. 6, as having a corresponding number of slots, commonly referenced at 70, defined through the inner radial surface 40. That is, and as may be seen best in the magnified view of FIG. 7, each of the projections 60 formed on the second end 36 of the inserted guard segments 20 is receivable upon the expansion of the body second end 36 in an interference engagement within a corresponding one of the slots 70 formed in the first end 34 of the adjacent guard segment 20. Such engagement effects a mechanical interlocking between the segments delimiting the removal of, for example, the second end 34 of segment 20a from the first end 34 of segment 20b. For cammingly engaging the chamfered leading edge surfaces 64 of the projections 60 in effecting the collapsing of the body second end 36 of the inserted guard segment 20, the inner surface 40 of the body first end 34 may be seen in FIG. 3 to be formed as having a cooperating and correspondingly angled camming surface, 72. An external collar, 74, may be provided as a reinforcement about body first end 34.

Figure 8:
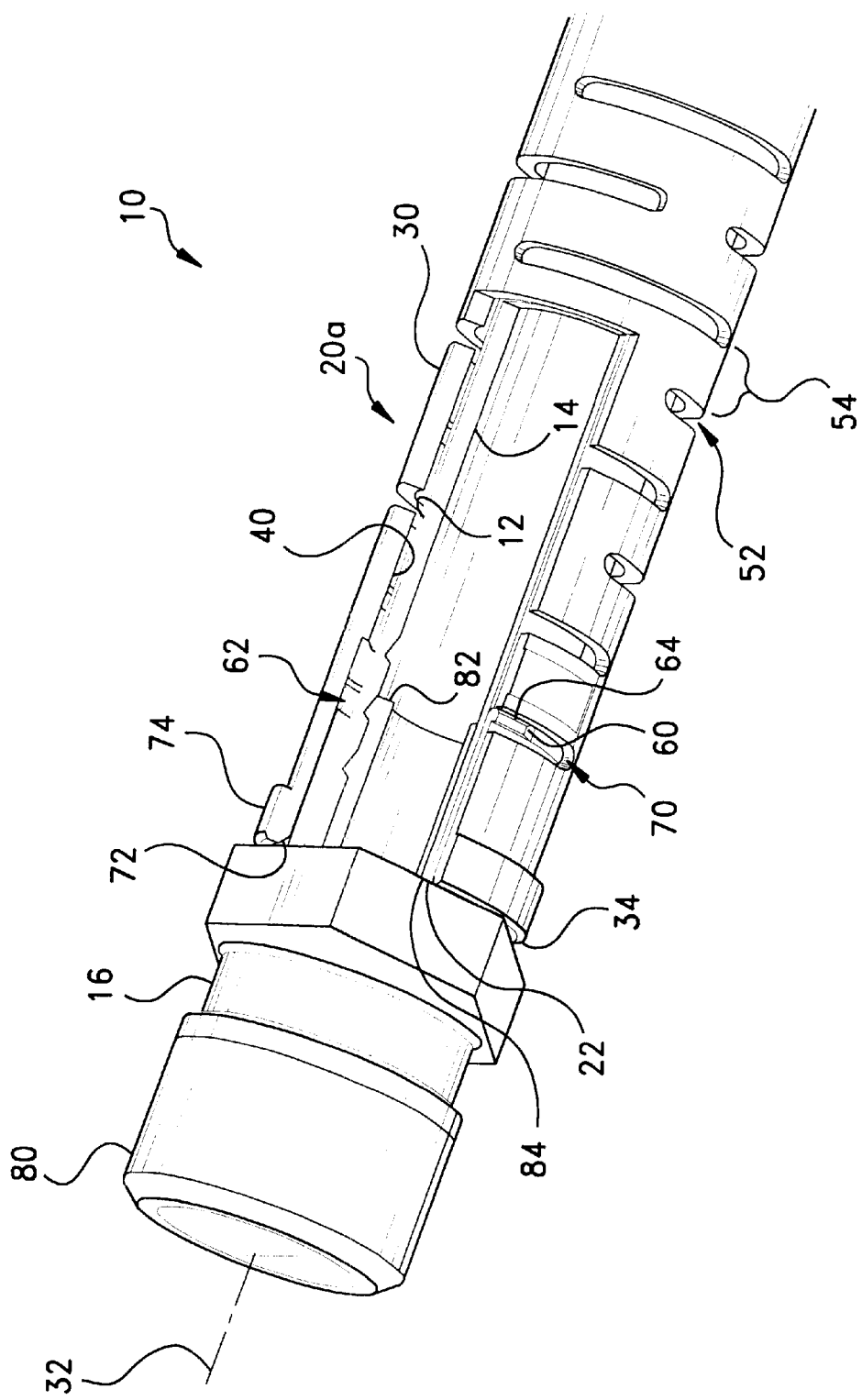
FIG. 8 is a magnified view of the cut-away section of the coil assembly of FIG. 1 showing the connection of the guard to the coil.

Advantageously, the guard assembly 10 and unit construction thereof of the present invention permits the use of economical, one-piece barbed-type fittings as the end connection for the tubing or hose. In this regard, reference may be had to the enlarged cross-sectional view of FIG. 8, wherein fitting 16 may be see to be provided as such type in having, for example, a threaded first end, 80, and a barbed second end, which is inserted within into the distal end, 84, of the tubing coil 14. With the first end 34 of guard segment 20a being interference fit over the tubing distal end 84, the necessity of providing a multi-component fitting, as heretofore conventionally was used with spring coil guards, is obviated.

Depending upon the application, compression sleeve 22 optionally may be interposed coaxially between the guard segment first end 34 and the tubing 14 as journalled over the external surface 12 thereof. With the axial length of the sleeve 22 preferably being about equal to the length of the fitting barb end 82, the compression of sleeve 22 by the guard inner surface 40 effects both the retention of the sleeve on the tubing surface 12 and the development of a radial compressive force about the tubing end 84 which assists in retaining the fitting barb end 82 in the tubing and in assuring a leak-free seal therebetween.

Advantageously, and as may be seen with momentary reference to the cross-sectional view of FIG. 3, sleeve 22 may be provided as is shown at 88 by sectioning a guard segment 20 through the first pairs of slots, 54a–b, thereof. With sleeve 22 so provided, it is inherently compressible via the provision of rebates 62, one of which is referenced at 62' in FIG. 8. Moreover, each of the tabs 64, now referenced commonly at 64' in FIG. 8, formed in sleeve 22 may be received in an interference engagement within a corresponding one of the slots 70 formed in the first end 34 of the first guard segment 20a. As before, such engagement effects a mechanical interlocking, now between the first segment 20a and sleeve 22, delimiting the longitudinal movement of segment 20a along tubing 14.

In an illustrative method for assembling guard 10 of FIG. 1, guard segments 20a and 20b may be manually "snap-fitted" together, with sleeve 22 also being manually snap-fitted into first segment 20a. With coil 14 being cut to length, the distal end 84 thereof may be manually inserted through the guard assembly 10. A press then may be employed to insert the barb end 82 of fitting 16 into the tubing distal end 84, and also to insert the tubing and fitting barb into the sleeve 22 of the assembly 10.

Figure 9:
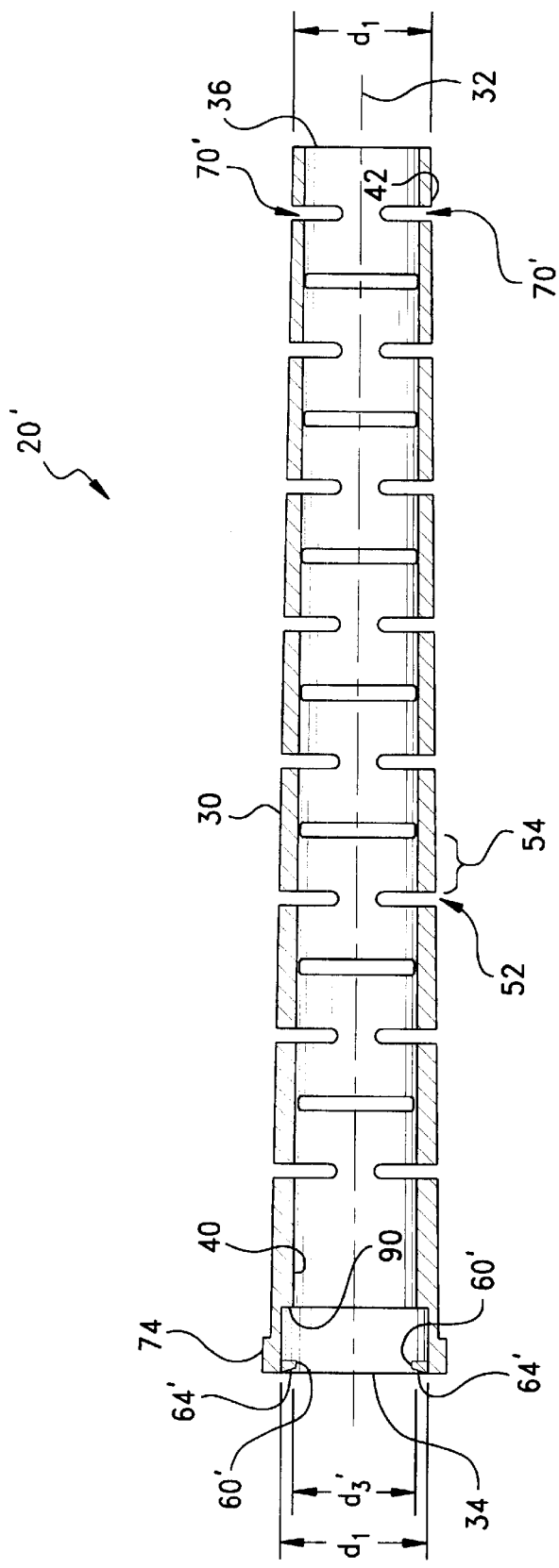
FIG. 9 is a cross-sectional view of an alternative embodiment of the guard segment of FIG. 2.

Turning next to FIG. 9, an alternative embodiment of guard segment 20 of the present invention is referenced generally at 20'. The construction of segment 20' is generally similar to that of the above-described segment 20, with the exception that projections 64, now referenced at 64', are formed to extend radially-inwardly from the inner radial surface 40 of the first end 34 thereof to define a third diametric extent, referenced at $d_3'$, which is smaller than the second diametric extent $d_2$ of the body second end outer radial surface 42. Correspondingly, slots 70, now referenced at 70', are formed into the body second end 36 such that each of the body first end projections 64' of an adjacent guard segment 20' are receivable in an interference engagement within a corresponding one of the slots 70'. The insertion of the second end 36 of one segment 20' into the first end 34 of an adjacent segment 20' may be delimited via the provision of an internal stop shoulder, 90, defined within the inner surface 40 of the body first end 34.

Figure 10:
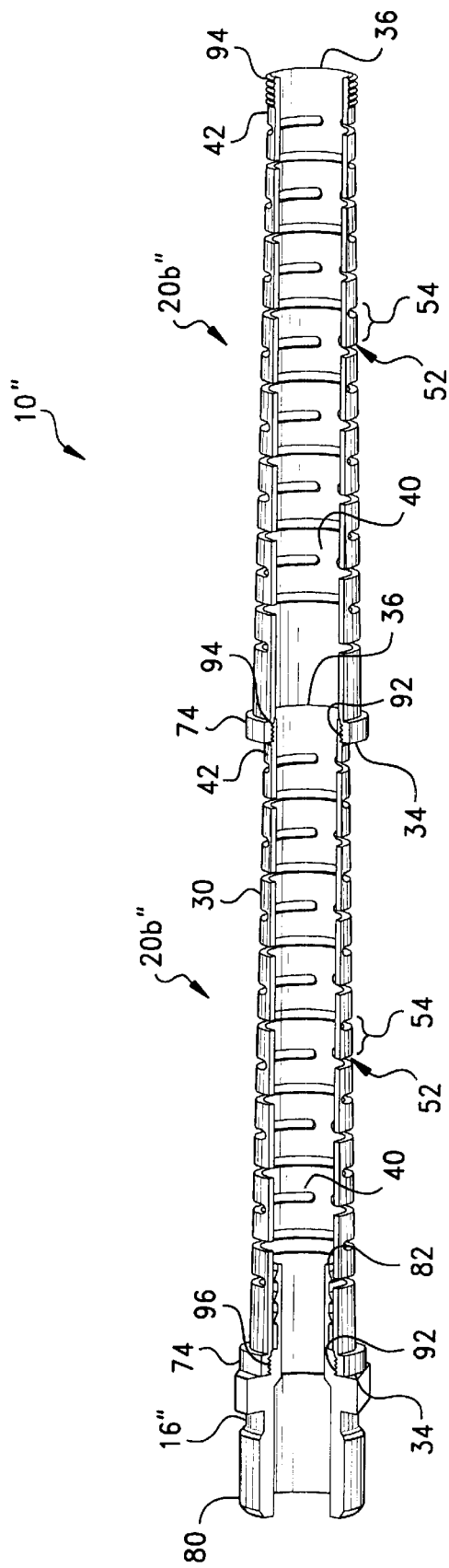
FIG. 10 is a perspective cut-away view of an alternative embodiment of the guard and fitting connection of FIG. 1.

Looking now to FIG. 10, another alternative embodiment of the present invention is shown with assembly 10 of FIG. 1 reappearing at 10" as including a first guard segment 20a", a second guard segment 20b", which again is series coupled to the first segment 20a", and a fitting 16". The basic construction of segments 20a–b" again is generally similar to that of the previously described segments 20 and 20', with the exception that the mechanical interlocking connection between projections 64 or 64' and slots 70 or 70' is replaced by a threaded connection. In this regard, the inner radial surface 40 of each of the body first ends 34 is formed as having an internally-threaded portion, commonly referenced in FIG. 10 at 92, with the outer radial surface 42 of each of the body second ends 36 being formed as having an externally-threaded portion, 94. Each of these externally threaded portions 94 is configured for a threaded coupling engagement with the internally-threaded portion 92 of an adjacent segment 20". Similarly, for coupling the first guard segment 20a" to the fitting 16", the fitting may be provided as having an externally-threaded portion, 96, disposed intermediate ends 80 and 82 thereof. With such portion 96 being configured for a threaded engagement with the internally threaded portion 92 of the guard segments 20", the first end 34 of segment 20a" may be threaded onto the fitting 16" to delimit any longitudinal movement the guard assembly 10" relative to the fitting. Advantageously, the threaded connections of assembly 10" may be effected after the segments 20" have been sheathed over the tubing or other conduit which is to be protected.

Figure 11:
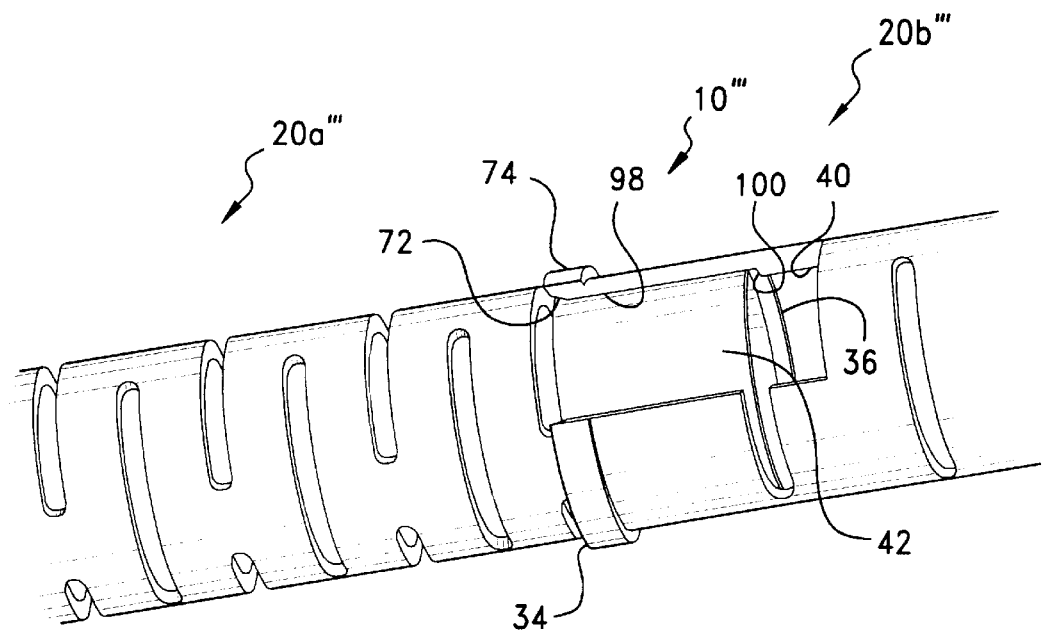
FIG. 11 is a magnified perspective view showing an alternative arrangement for the connection of the guard segments of FIG. 1.
Figure 12:
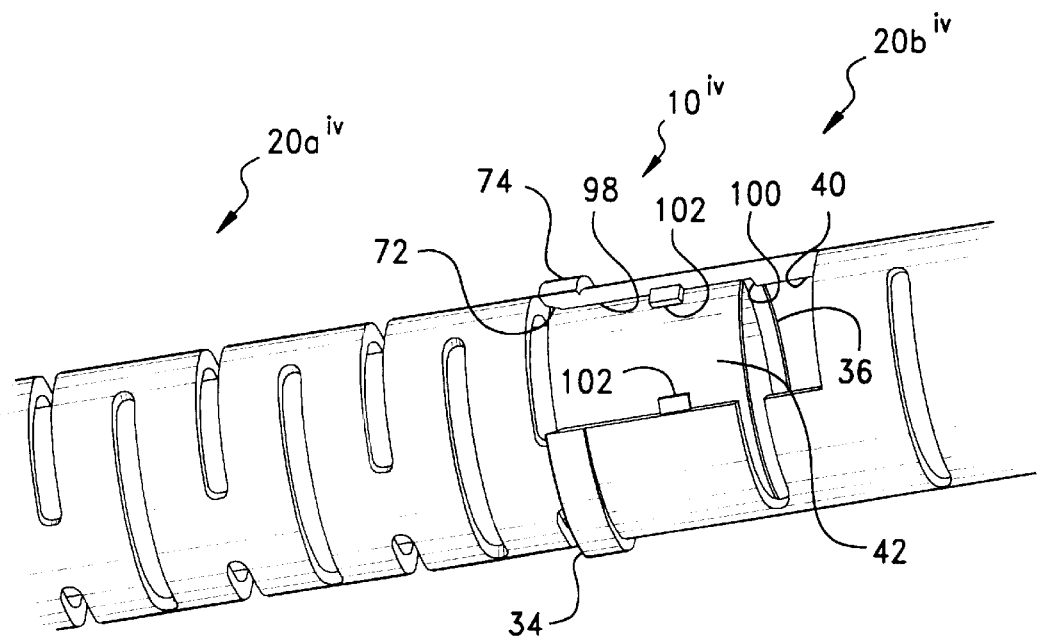
FIG. 12 is a magnified perspective view showing another alternative arrangement for the connection of the guard segments of FIG. 1.

Turning lastly to FIGS. 11 and 12, still other alternative arrangements for the coupling of segments 20a–b are shown at 10''' in FIG. 11 and at 10$^{iv}$ in FIG. 12. In FIG. 11, an arrangement for the adhesive bonding of the second end 36 of segment 20a''' the first end 34 of segment 20b''' is shown. In such arrangement, the inner radial surface 40 of the body first ends 34 is configured as having a tapered counterbored portion, 98, which terminates at an internal, generally-annular stop shoulder, 100. The second end 36 of an adjacent segment 20''' is receivable within the counterbored portion 98 into abutting engagement with the stop shoulder 100 in a coaxial, overlap or shear-type joint configuration, with an adhesive interlayer (not shown) being provided to effect a bond therebetween. The particular adhesive and application method used will depend upon the materials of construction for segments 20''', with rubber-based, thermoplastic hot-melts, polyurethanes, epoxies, acrylate, and silicones all having potential applicability.

The arrangement of FIG. 12 is similar to that of FIG. 11 with the exception that one or more projections, collectively referenced at 102, are formed into one or both the inner surface 40 of the body first ends 34 or the outer surface 42 of the body second ends 36. With segments 20$^{iv}$ being constructed of a thermoplastic or other meltable material, projections 102, commonly referred to as energy directors, may be employed to fuse the bondline between the body ends 34 and 36 via an ultrasonic welding process. Other fusion welding or heating processes, such as spin, vibration, dielectric, microwave, induction, resistance, or hot-plate, also may find applicability.

As it is anticipated that certain changes may be made in the present invention without departing from the precepts herein involved, it is intended that all matter contained in the foregoing description shall be interpreted as illustrative and not in a limiting sense. All references cited herein are expressly incorporated by reference.

What is claimed is:

1. A guard segment for use in a protective guard for a conduit having a generally cylindrical external surface and a minimum bend radius, said guard comprising a first said guard segment and at least a second said guard segment, each said guard segment being receivable coaxially over the conduit external surface and comprising an elongate, generally-annular body, said body extending longitudinally along a central axis of said guard segment intermediate a first end and a second end defining a unit length of the guard therebetween, said body first end having an inner radial surface of a first diametric extent and said body second end having an outer radial surface of a second diametric extent configured to be receivable within the first diametric extent of the inner radial surface of the first end of an adjacent said guard segment for coupling each said guard segment to said adjacent said guard segment, and said body being flexible along said longitudinal extent thereof to conform to said conduit when said conduit is flexed along its minimum bend radius.

2. The guard segment of claim 1 wherein said body is formed of a polymeric material selected from the group consisting of poly(ether ether ketones), polyimides, polyamides, polyolefins, polyetherimides, polybutylene terephthalates, nylons, fluoropolymers, polyvinyl chlorides, polysulfones, polyesters, acetal homo and copolymers, and copolymers and blends thereof.

3. The guard segment of claim 1 wherein the inner radial surface of said body first end has an internally-threaded portion, and wherein the outer radial surface of said body second end has an externally-threaded portion configured for a threaded engagement with the internally-threaded portion of the first end of said adjacent said guard segment.

4. The guard segment of claim 1 wherein said body second end is formed as having one or more projections which extend radially-outwardly from the outer radial surface thereof to define a third diametric extent which is greater than the first diametric extent of said body first end inner radial surface, and wherein said body first end is formed as having one or more slots defined within the inner radial surface thereof, each of said body second end projections being receivable in an interference engagement within a corresponding one of the slots of the first end of said adjacent said guard segment.

5. The guard segment of claim 1 wherein said body first end is formed as having one or more projections which extend radially-inwardly from the inner radial surface thereof to define a third diametric extent which is smaller than said second diametric extent of said body second end outer radial surface, and wherein said body second end is formed as having one or more slots defined within the outer radial surface thereof, each of the body first end projections of said adjacent said guard segment being receivable in an interference engagement within a corresponding one of said slots of said body second end outer radial surface.

6. A protective guard assembly for a conduit having a generally cylindrical external surface and a minimum bend radius, said guard assembly comprising:

a first guard segment; and at least a second said guard segment, each said guard segment being receivable coaxially over the conduit external surface and comprising an elongate, generally-annular body, said body extending longitudinally along a central axis of the guard segment intermediate a first end and a second end defining a unit length of the guard assembly therebetween, said body first end having an inner radial surface of a first diametric extent and said body second end having an outer radial surface of a second diametric extent configured to be received within the first diametric extent of the inner radial surface end of the first end of an adjacent said guard segment for coupling each said guard segment to said adjacent said guard segment, wherein the second end of said first guard segment is received within the first end of said second guard segment to couple said first guard segment to said second guard segment, and wherein said body of one or both said first and said second guard segment is flexible along said longitudinal extent thereof allowing said guard segment to conform to said conduit when said conduit is flexed along its minimum bend radius.

7. The guard assembly of claim 6 wherein said body is formed of a polymeric material selected from the group consisting of poly(ether ether ketones), polyimides, polyamides, polyolefins, polyetherimides, polybutylene terephthalates, nylons, fluoropolymers, polyvinyl chlorides, polysulfones, polyesters, acetal homo and copolymers, and copolymers and blends thereof.

8. The guard assembly of claim 6 wherein the inner radial surface of said body first end has an internally-threaded portion, and wherein the outer radial surface of said body second end has an externally-threaded portion configured for a threaded engagement with the internally-threaded portion of the first end of said adjacent said guard segment, the externally-threaded portion of the second end of said first guard segment being threadably engaged with the externally-threaded portion of the first end of the second guard segment.

9. The guard assembly of claim 6 wherein said body second end is formed as having one or more projections which extend radially-outwardly from the outer radial surface thereof to define a third diametric extent which is greater than the first diametric extent of said body first end inner radial surface, and wherein said body first end is formed as having one or more slots defined within the inner radial surface thereof, each of said body second end projections being receivable in an interference engagement within a corresponding one of the slots defined in the inner surface of the first end of said adjacent said guard segment, each of the projections of the second end of said first guard segment being engaged with a corresponding one of the slots of the first end of said second guard segment.

10. The guard assembly of claim 6 wherein said body first end is formed as having one or more projections which extend radially-inwardly from the inner radial surface thereof to define a third diametric extent which is smaller than said second diametric extent of said body second end outer radial surface, and wherein said body second end is formed as having one or more slots defined within the outer radial surface thereof, each of the body first end projections of said adjacent said guard segment being receivable in an interference engagement within a corresponding one of said slots of said body second end outer radial surface, and each of the projections of the first end of said second guard segment being engaged with a corresponding one of the slots of the second end of said first guard segment.

11. The guard assembly of claim 6 wherein the inner radial surface of said body first end has a radial-inwardly extending stop shoulder, and wherein said body second end is abuttingly engagable with the stop shoulder of the first end of said adjacent said guard segment for delimiting the longitudinal extent of said second end received within the first end of said adjacent said guard segment, the second end of said first guard segment being abuttingly engaged with the stop shoulder of the first end of the second guard segment.

12. A guard segment for use in a protective guard for a conduit having a generally cylindrical external surface, said guard comprising a first said guard segment and at least a second said guard segment, each said guard segment being receivable coaxially over the conduit external surface and comprising an elongate, generally-annular body, said body extending longitudinally along a central axis of said guard segment intermediate a first end and a second end defining a unit length of the guard therebetween, said body first end having an inner radial surface of a first diametric extent formed as having one or more slots defined therein, and said body second end having an outer radial surface of a second diametric extent configured to be receivable within the first diametric extent of the inner radial surface of the first end of an adjacent said guard segment for coupling each said guard segment to said adjacent said guard segment, and being formed as having one or more projections which extend radially-outwardly from the outer radial surface thereof to define a third diametric extent which is greater than the first diametric extent of said body first end inner radial surface and normally larger than the first diametric extent defined by said body first end inner radial surface, each of said body second end projections being receivable in an interference engagement within a corresponding one of the slots of the first end of said adjacent said guard segment, and said body second end being further formed as having one or more rebates therethrough, said second end being collapsible through said rebates such that the third diametric extent defined by said projections is smaller than the first diametric extent defined by the first end inner radial surface to allow said second end to be received within the first end of said adjacent said guard segment, and said second end being resiliently expandable when received within the first end of said adjacent said guard segment for the engagement of said projections with said slots.

13. The guard segment of claim 12 wherein each of said body second end projections includes a chamfered leading edge surface, said leading edge surface being cammingly engagable with the inner radial surface of the first end of said adjacent said guard segment to collapse said body second end through said rebates.

14. A protective guard assembly for a conduit having a generally cylindrical external surface, said guard assembly comprising:

a first guard segment; and at least a second said guard segment, each said guard segment being receivable coaxially over the conduit external surface and comprising an elongate, generally-annular body, said body extending longitudinally along a central axis of the guard segment intermediate a first end and a second end defining a unit length of the guard assembly therebetween, said body first end having an inner radial surface of a first diametric extent, and said body second end having an outer radial surface of a second diametric extent configured to be received within the first diametric extent of the inner radial surface end of the first end of an adjacent said guard segment for coupling each said guard segment to said adjacent said guard segment, wherein said body second end is formed as having one or more projections which extend radially-outwardly from the outer radial surface thereof to define a third diametric extent which is greater than the first diametric extent of said body first end inner radial surface, and said body first end is formed as having one or more slots defined within the inner radial surface thereof, wherein the third diametric extent defined by said body second end projections is normally larger than the first diametric extent defined by said body first end inner radial surface, and said body second end further is formed as having one or more rebates therethrough, and wherein the second end of said first guard segment is received within the first end of said second guard segment to couple said first guard segment to said second guard segment with each of said body second end projections being receivable in an interference engagement within a corresponding one of the slots defined in the inner surface of the first end of said adjacent said guard segment, each of the projections of the second end of said first guard segment being engaged with a corresponding one of the slots of the first end of said second guard segment, whereby said second end is collapsible through said rebates such that the third diametric extent defined by said projections is smaller than the first diametric extent defined by the first end inner radial surface to allow said second end to be received within the first end of said adjacent said guard segment, and said second end is resiliently expandable when received within the first end of said adjacent said guard segment for the engagement of said projections with said slots.

15. The guard assembly of claim 14 wherein each of said body second end projections includes a chamfered leading edge surface, said leading edge surface being cammingly engagable with the inner radial surface of the first end of said adjacent said guard segment to collapse said body second end through said rebates.

16. A protective guard assembly for a conduit having an associated fitting, the conduit having a generally cylindrical external surface and a distal end portion, and having a minimum bend radius, the fitting having a barb received within the conduit distal end portion, said guard assembly comprising:

a guard segment receivable coaxially over the external surface of the conduit and comprising an elongate, generally-annular body, said body extending longitudinally along a central axis of said guard segment intermediate a first end receivable over the conduit distal end portion and the fitting barb received therein, and a second end defining a unit length of said guard assembly therebetween, said body first end having an inner radial surface of a first diametric extent including one or more slots defined therein, and said body second end having an outer radial surface of a second diametric extent configured to be received within the first diametric extent of the inner radial surface end of the first end of an adjacent said guard segment for coupling each said guard segment to a said adjacent said guard segment; and a generally annular sleeve journalable over the conduit distal end portion and the fitting barb received therein the conduit distal end portion, said sleeve being interposable coaxially between the external surface of the conduit and the inner surface of the first end of said guard segment, and said sleeve being compressible by the inner surface of the first end of said guard segment for the retention of said sleeve on the external surface of the conduit and having one or more radially-outwardly extending tabs, each of said tabs being received within a corresponding one of the slots defined within the inner surface of the first end of said guard segment in an interference engagement delimiting the longitudinal movement of said guard segment along the conduit.

17. A guard segment for use in a protective guard for a conduit having a generally cylindrical external surface and a minimum bend radius, said guard comprising a first said guard segment and at least a second said guard segment, each said guard segment being receivable coaxially over the conduit external surface and comprising an elongate, generally-annular body, said body extending longitudinally along a central axis of said guard segment intermediate a first end and a second end defining a unit length of the guard therebetween, said body first end having an inner radial surface of a first diametric extent and said body second end having an outer radial surface of a second diametric extent configured to be receivable within the first diametric extent of the inner radial surface of the first end of an adjacent said guard segment for coupling each said guard segment to said adjacent said guard segment, and said body having a series of strain relief slots formed along the longitudinal extent thereof, said body being flexible along said slots allowing said guard segment to conform to said conduit when said conduit is flexed along its minimum bend radius.

18. A guard segment for use in a protective guard for a conduit, the conduit having a generally cylindrical external surface and a distal end, and a fitting connected to the distal end, the fitting having an externally-threaded portion, said guard comprising a first said guard segment and at least a second said guard segment, each said guard segment being receivable coaxially over the conduit external surface and comprising an elongate, generally-annular body, said body extending longitudinally along a central axis of said guard segment intermediate a first end and a second end defining a unit length of the guard therebetween, said body first end having an inner radial surface of a first diametric extent and said body second end having an outer radial surface of a second diametric extent configured to be receivable within the first diametric extent of the inner radial surface of the first end of an adjacent said guard segment for coupling each said guard segment to said adjacent said guard segment, the inner radial surface of said body first end having an internally-threaded portion configured for a threaded engagement with the externally-threaded portion of the fitting for connecting the guard to the fitting, and the outer radial surface of said body second end having an externally-threaded portion configured for a threaded engagement with the internally-threaded portion of the first end of said adjacent said guard segment.

19. A guard segment for use in a protective guard for a conduit having a generally cylindrical external surface, said guard comprising a first said guard segment and at least a second said guard segment, each said guard segment being receivable coaxially over the conduit external surface and comprising an elongate, generally-annular body, said body extending longitudinally along a central axis of said guard segment intermediate a first end and a second end defining a unit length of the guard therebetween, said body first end having an inner radial surface of a first diametric extent and said body second end having an outer radial surface of a second diametric extent configured to be receivable within the first diametric extent of the inner radial surface of the first end of an adjacent said guard segment for coupling each said guard segment to said adjacent said guard segment said body first end being formed as having one or more projections which extend radially-inwardly from the inner radial surface thereof to define a third diametric extent which is smaller than said second diametric extent of said body second end outer radial surface, and said body second end being formed as having one or more slots defined within the outer radial surface thereof, each of the body first end projections of said adjacent said guard segment being receivable in an interference engagement within a corresponding one of said slots of said body second end outer radial surface the second diametric extent of said body second end being normally larger than the third diametric extent defined by said projections of said first end inner radial surface, and said body second end being further formed as having one or more rebates therethrough, said second end being collapsible through said rebates such that the second diametric extent of said second end is smaller than the third diametric extent defined by the projections of the first end of said adjacent said guard segment to allow said second end to be received within the first end of said adjacent said guard segment, and said second end being resiliently expandable when received within the first end of said adjacent said guard segment for the engagement of said projections with said slots.

20. A protective guard assembly for a conduit having a generally cylindrical external surface and a minimum bend radius, said guard assembly comprising:

a first guard segment; and at least a second said guard segment, each said guard segment being receivable coaxially over the conduit external surface and comprising an elongate, generally-annular body, said body extending longitudinally along a central axis of the guard segment intermediate a first end and a second end defining a unit length of the guard assembly therebetween, said body first end having an inner radial surface of a first diametric extent and said body second end having an outer radial surface of a second diametric extent configured to be received within the first diametric extent of the inner radial surface end of the first end of an adjacent said guard segment for coupling each said guard segment to said adjacent said guard segment, wherein the second end of said first guard segment is received within the first end of said second guard segment to couple said first guard segment to said second guard segment; and wherein said body of one or both said first and said second guard segment has a series of strain relief slots formed along the longitudinal extent thereof, said body being flexible along said slots allowing said guard segment to conform to said conduit when said conduit is flexed along its minimum bend radius.

21. A protective guard assembly for a conduit having a generally cylindrical external surface, said guard assembly comprising:

a first guard segment; and at least a second said guard segment, each said guard segment being receivable coaxially over the conduit external surface and comprising an elongate, generally-annular body, said body extending longitudinally along a central axis of the guard segment intermediate a first end and a second end defining a unit length of the guard assembly therebetween, said body first end having an inner radial surface of a first diametric extent and said body second end having an outer radial surface of a second diametric extent configured to be received within the first diametric extent of the inner radial surface end of the first end of an adjacent said guard segment for coupling each said guard segment to said adjacent said guard segment, wherein the second end of said first guard segment is received within the first end of said second guard segment to couple said first guard segment to said second guard segment; and wherein the body of one of said first guard segment and said second guard member is provided to be flexible and wherein the body of the other of said first guard segment and said second guard segment is provided to be substantially rigid.

22. A protective guard assembly for a conduit having a generally cylindrical external surface and a distal end with a fitting connected thereto, said fitting having an externally-threaded portion, and said guard assembly comprising:

a first guard segment; and at least a second said guard segment, each said guard segment being receivable coaxially over the conduit external surface and comprising an elongate, generally-annular body, said body extending longitudinally along a central axis of the guard segment intermediate a first end and a second end defining a unit length of the guard assembly therebetween, said body first end having an inner radial surface of a first diametric extent and having an internally-threaded portion, and said body second end having an outer radial surface of a second diametric extent configured to be received within the first diametric extent of the inner radial surface end of the first end of an adjacent said guard segment for coupling each said guard segment to said adjacent said guard segment, and having an externally-threaded portion configured for a threaded engagement with the internally-threaded portion of the first end of said adjacent said guard segment, wherein the second end of said first guard segment is received within the first end of said second guard segment to couple said first guard segment to said second guard segment with the externally-threaded portion of the second end of said first guard segment being threadably engaged with the externally-threaded portion of the first end of the second guard segment, and wherein the internally-threaded portion of said body first end is configured for a threaded engagement with the externally-threaded portion of the fitting for connecting the guard to the fitting, the internally threaded portion of the first end of said first guard segment being threadably engagable with the externally-threaded portion of the fitting.

23. A protective guard assembly for a conduit having a generally cylindrical external surface, said guard assembly comprising:

a first guard segment; and at least a second said guard segment, each said guard segment being receivable coaxially over the conduit external surface and comprising an elongate, generally-annular body, said body extending longitudinally along a central axis of the guard segment intermediate a first end and a second end defining a unit length of the guard assembly therebetween, said body first end having an inner radial surface of a first diametric extent, and said body second end having an outer radial surface of a second diametric extent configured to be received within the first diametric extent of the inner radial surface end of the first end of an adjacent said guard segment for coupling each said guard segment to said adjacent said guard segment, wherein said body first end is formed as having one or more projections which extend radially-inwardly from the inner radial surface thereof to define a third diametric extent which is smaller than said second diametric extent of said body second end outer radial surface, and said body second end is formed as having one or more slots defined within the outer radial surface thereof, wherein the second diametric extent of said body second end is normally larger than the third diametric extent defined by said of the first end inner radial surface, and said body second end further is formed as having one or more rebates therethrough, and wherein the second end of said first guard segment is received within the first end of said second guard segment to couple said first guard segment to said second guard segment with each of the projections of the first end of said second guard segment being engaged with a corresponding one of the slots of the second end of said first guard segment, whereby said second end is collapsible through said rebates such that the second diametric extent of said second end is smaller than the third diametric extent defined by the projections of the first end of said adjacent said guard segment to allow said second end to be received within the first end of said adjacent said guard segment, and said second end is resiliently expandable when received within the first end of said adjacent said guard segment for the engagement of said projections with said slots with each of the body first end projections of said adjacent said guard segment being receivable in an interference engagement within a corresponding one of said slots of said body second end outer radial surface.

24. A protective guard assembly for a conduit having a generally cylindrical external surface and a distal end portion with an associated fitting connected thereto, the fitting having a barb received within the conduit distal end portion, and said guard assembly comprising:

a first guard segment;

at least a second said guard segment, each said guard segment being receivable coaxially over the conduit external surface and comprising an elongate, generally-annular body, said body extending longitudinally along a central axis of the guard segment intermediate a first end and a second end defining a unit length of the guard assembly therebetween, said body first end having an inner radial surface of a first diametric extent and said body second end having an outer radial surface of a second diametric extent configured to be received within the first diametric extent of the inner radial surface end of the first end of an adjacent said guard segment for coupling each said guard segment to said adjacent said guard segment; and a generally annular sleeve journalable over the conduit distal end portion and the fitting barb received therein, wherein the first end of said first guard segment is receivable over the conduit distal end portion and the fitting barb received therein with the sleeve being interposable coaxially between the external surface of the conduit and the inner surface of the first end of said first guard segment, said sleeve being compressible by the inner surface of the first end of said first guard segment for the retention of said sleeve on the external surface of the conduit and having one or more radially-outwardly extending tabs, each of said tabs being received within a corresponding one of the slots defined within the inner surface of the first end of said first guard segment in an interference engagement delimiting the longitudinal movement of said first guard segment along the conduit, and wherein the second end of said first guard segment is received within the first end of said second guard segment to couple said first guard segment to said second guard segment.

25. A protective guard assembly for a conduit having a generally cylindrical external surface, said guard assembly comprising:

a first guard segment; and at least a second said guard segment, each said guard segment being receivable coaxially over the conduit external surface and comprising an elongate, generally-annular body, said body extending longitudinally along a central axis of the guard segment intermediate a first end and a second end defining a unit length of the guard assembly therebetween, said body first end having an inner radial surface of a first diametric extent, and having a radial-inwardly extending stop shoulder, and said body second end having an outer radial surface of a second diametric extent configured to be received within the first diametric extent of the inner radial surface end of the first end of an adjacent said guard segment for coupling each said guard segment to said adjacent said guard segment, and being abuttingly engagable with the stop shoulder of the first end of said adjacent said guard segment for delimiting the longitudinal extent of said second end received within the first end of said adjacent said guard segment, wherein the second end of said first guard segment is received within the first end of said second guard segment to couple said first guard segment to said second guard segment with the second end of said first guard segment being abuttingly engaged with the stop shoulder of the first end of the second guard segment, and wherein the outer radial surface of the second end of said first guard segment is bonded to the inner radial surface of the first end of said second guard segment to couple said first guard segment to said second guard segment.

26. A protective guard assembly for a conduit having a generally cylindrical external surface, said guard assembly comprising:

a first guard segment; and at least a second said guard segment, each said guard segment being receivable coaxially over the conduit external surface and comprising an elongate, generally-annular body, said body extending longitudinally along a central axis of the guard segment intermediate a first end and a second end defining a unit length of the guard assembly therebetween, said body first end having an inner radial surface of a first diametric extent and having a radial-inwardly extending stop shoulder, and said body second end having an outer radial surface of a second diametric extent configured to be received within the first diametric extent of the inner radial surface end of the first end of an adjacent said guard segment for coupling each said guard segment to said adjacent said guard segment, and being abuttingly engagable with the stop shoulder of the first end of said adjacent said guard segment for delimiting the longitudinal extent of said second end received within the first end of said adjacent said guard segment, wherein the second end of said first guard segment is received within the first end of said second guard segment to couple said first guard segment to said second guard segment with the second end of said first guard segment being abuttingly engaged with the stop shoulder of the first end of the second guard segment, and wherein one or both the inner radial surface of said body first end and the outer radial surface of said body second end is formed as having one or more energy directing protrusions, the outer radial surface of the second end of said first guard segment being ultrasonically bonded to the inner radial surface of the first end of said second guard segment to couple said first guard segment to said second guard segment.

* * * * *